United States Patent [19]
Seki

[11] Patent Number: 5,861,943
[45] Date of Patent: Jan. 19, 1999

[54] PHOTOGRAPHIC PROCESSOR

[75] Inventor: Koji Seki, Wakayama-ken, Japan

[73] Assignee: Noritsu Koki Co., Ltd., Wadayama, Japan

[21] Appl. No.: 927,200

[22] Filed: Sep. 11, 1997

[30] Foreign Application Priority Data

Sep. 13, 1996 [JP] Japan ................................. 8-243063

[51] Int. Cl.⁶ ............................. G03B 27/52; G03B 27/80
[52] U.S. Cl. ............................................. 355/40; 355/41
[58] Field of Search ................... 355/40, 41, 42, 355/43

[56] References Cited

U.S. PATENT DOCUMENTS

5,729,328  3/1998  Kimura et al. ......................... 355/40
5,729,329  3/1998  Ajimu et al. .......................... 355/40

*Primary Examiner*—A. A. Mathews
*Attorney, Agent, or Firm*—Smith Patent Office

[57] ABSTRACT

A photographic processor which allows smooth positioning of an image frame whose configuration cannot be detected by a picture detecting sensor is provided. A picture detecting sensor is installed in a negative film supply section for deciding the condition of the negative film and a notch mechanism is also installed therein which gives a position indicating notch to an image frame visually when the image frame is judged to be improper for positioning by the picture detecting sensor.

17 Claims, 7 Drawing Sheets

PHOTOGRAPHIC PROCESSOR

BACKGROUND OF THE INVENTION

1. Field of the Invention

The present invention relates to a photographic processor comprising a negative film supply section for conveying and supplying a negative film and an exposure section for printing an image frame of the negative film conveyed and supplied from the negative film supply section onto a printing paper. In particular this invention relates to the technology for positioning the negative film in the photographic processor.

2. Discussion of the Related Art

In a conventional photographic processor to print an image frame onto printing paper by the use of a negative film, a notch punched on the negative film has been used for positioning the image frame of the negative film in a film reading device to scan each image frame for obtaining a corrected exposure condition and in an exposure device to expose the printing paper to light through each image frame. Before the negative film is mounted on the photographic processor, this notch is punched in the vicinity of each image frame by a notch punching device such as is disclosed in Japanese Patent Laid-Open Publication No. 184036/1991.

As described above, after a developed negative film is mounted on the notch punching device and the notches are punched in it for positioning, the negative film is rewound and dismounted from the notch punching device. Then the negative film is installed into the negative film supply section of the photographic processor. Consequently, these complicated processes make it difficult for the negative film to be processed consecutively in a continuous manner. Therefore, instead of using the notches, for positioning the negative film in the photographic processor, another technology is proposed to confirm a configuration of the image frame by a detected signal from a picture sensor for positioning the negative film. This technology allows the elimination of punching a number of notches in the negative film so that the processing of the negative film can be continuous. However, all of the image frames on the negative films do not have configurations clear enough to be automatically detected by the picture detecting sensor. In the case they are not clear enough, the negative film should be positioned by another method. For example, an image frame with an unclear configuration can be positioned by using a picture with a clear configuration, taking it as a reference point and then feeding the negative film a predetermined amount from that clear image. This method works when there is such an image frame nearby that is clear enough to be used for positioning by the picture detecting sensor. However, when the image frame with an unclear configuration is a certain distance away from that image frame with a clear configuration, it is difficult to stop the negative film accurately at its expected position due to the margin of error in the amount the negative film is fed. To solve this problem, an operator must visually position the image frame which has an unclear configuration as described above. This prevents the photographic processor from working with a high operating efficiency because the photographic processing includes many processing portions in which the negative film should be positioned and these include the film reading portion, an exposure portion, a cutting portion to cut into a piece of negative film and so on.

SUMMARY OF THE INVENTION

An object of the present invention is to provide a photographic processor which solves the problems described above related to the conventional devices.

Another object of the present invention is to provide a photographic process that allows any image frame whose configuration cannot be detected by a picture detecting sensor to be smoothly positioned at any position without consuming excessive time.

To solve the problem described above, the present invention provides a photographic processor comprising a negative film supply section for supplying and conveying a negative film and an exposure section for printing an image frame of the negative film supplied and conveyed from the negative film supply section. The photographic processor includes a picture detecting sensor for judging a condition of an image frame on the negative film. The picture detecting sensor is installed in the negative film supply section and a mark forming means is installed also for providing a visual positioning mark to the image frame when the image frame is judged by the picture detecting sensor to be improper for positioning.

In the system of the present invention, an operator gives a positioning mark visually by using the mark forming means for an image frame which is detected to be improper for positioning by the picture detecting sensor in the negative film supply section. The image frame determined to be improper can be positioned by using this positioning mark in the following portions of the processor, including the exposure section. Since the positioning mark is only given to the image frame which is judged to be improper for positioning and the other image frames are positioned by the picture detecting sensor, the difficult work to provide positioning marks to all of the image frames is not required. Thus, the present invention enables the negative film to be positioned automatically and continuously by installing both a picture detecting sensor and a marking sensor in the portions where positioning of the image frame is necessary, for example, in the exposure section.

In a preferred embodiment of the present invention, loop forming portions for the negative film are disposed both upstream and downstream of the mark forming means in the negative film conveying direction. Although the negative film is moved backward and forward while the visual positioning mark is given to the image frame by the use of the mark forming means, the flexible effect of the loop forming portions disposed both upstream and the downstream of the mark forming means prevents movement of the negative film near the mark forming means from influencing the other processing portions beyond each loop forming portion. This provides a remarkable advantage when the negative film is a long strip composed of a number of connected shorter pieces of negative film.

It is more favorable that an separate or exclusive negative film conveying means be installed for the negative film between the two loop forming portions. This system allows the negative film to be moved backward and forward while being given the positioning mark at a different speed from that for normal conveying in other portions of the processor. Therefore the negative film can be positioned quickly and accurately by combining the rough and fine operations.

To facilitate the operation of providing a positioning mark to an image frame by the use of the mark forming means, a preferred embodiment of the present invention is provided with a TV camera for taking photos of the operation so the operator can give the image frame a positioning mark by the use of the mark forming means. Therefore an operator can control this operation to provide the positioning mark while confirming this using the photos transmitted from the TV camera and displayed on a monitor. Consequently, the operator can give the positioning mark while looking at the monitor and confirming the position of the image frame without leaving his normal working desk area.

As for the actual mark punched by the mark forming means, it can be a mark, an aperture, a notch etc., made, for example, by a typing printer. A mark punched by a notcher which is used to give a parting mark to the printing paper is convenient because it can be commonly used to control design and parts replacement. Accordingly, in a preferred embodiment of the present invention, the mark forming means is provided with a notcher for punching a notch on the side edge of the negative film and this notcher can be operated through an operation panel installed on the photographic processor. Further, if the mark forming means is equipped with a suction nozzle for sucking the chips produced by the notcher, the notch chips are prevented from attaching themselves to the negative film and having an adverse influence on the exposure processing.

In an embodiment of a photographic processor of the present invention, the negative film supplied and conveyed from the negative film supply section to the exposure section is a short piece of negative film divided from a long piece of negative film by cutting it in a connecting member. The long piece of negative film has been formed by connecting a plurality of negative films with connecting members. In this system, in the negative film supply section a negative film roll which has been wound up in a long piece of negative film, composed of a plurality of negative films (about 100 negative films), is mounted. This long piece is connected together by connecting members for developing efficiently. The image frames are checked by a picture detecting sensor before the short pieces of negative film are produced by cutting the long piece of negative film in its connecting member areas. The positioning marks can also be used for cutting the connecting members, if necessary.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which.

Other features and advantages of the present invention will be made clear by the following description of the preferred embodiments accompanying with the drawings.

DETAILED DESCRIPTION OF THE PREFERRED EMBODIMENTS

Figure 1:
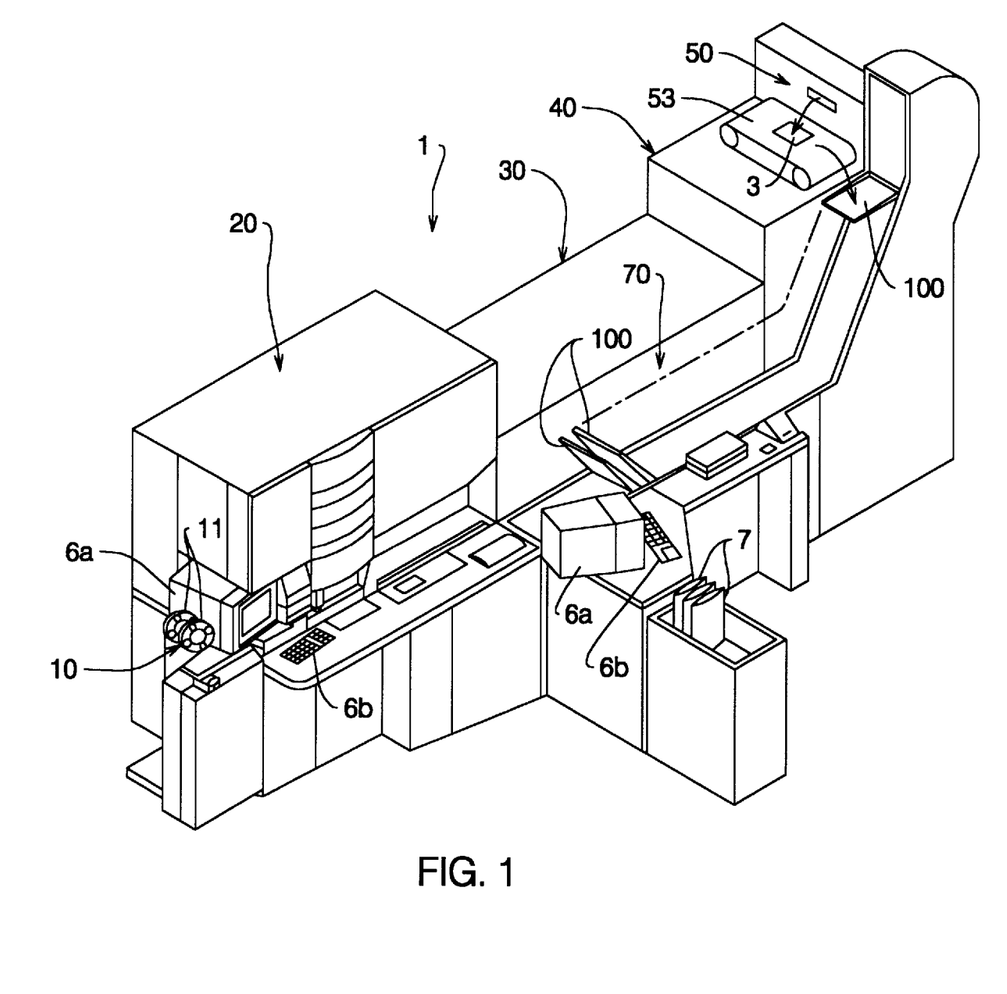
FIG. 1 is a perspective view of a photographic processor according to the present invention.
Figure 2:
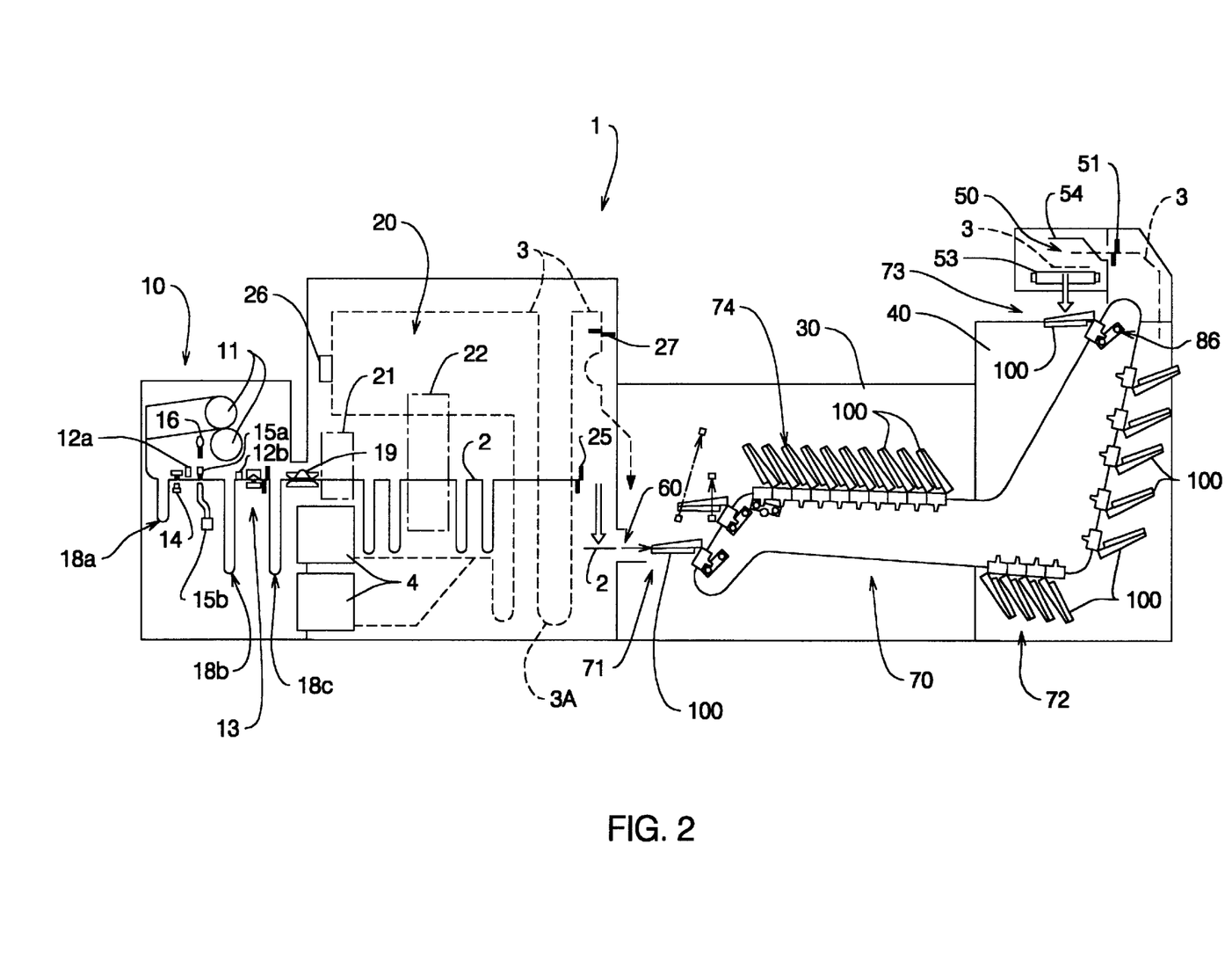
FIG. 2 is a schematic view of the flow of the negative film and the printing film in the photographic processor of FIG. 1.

FIG. 1 shows an overall view of a photographic processor according to the present invention. FIG. 2 shows a schematic conveying passage of a negative film 2 and a printing paper 3 which are conveyed through a series of processing stations in the photographic processor 1. The photographic processor 1 comprises: a negative film supply section 10; an exposure section 20 to print a picture image of the negative film 2 onto the printing paper 3 pulled out of a printing paper magazine 4; a development section 30 to develop the printing paper 3 exposed in the exposure section 20; a drying section 40 to dry the printing paper 3 developed in the development section 30; a print send-out section 50 to cut the dried printing paper 3 into a predetermined length (a printing paper 3 cut into a predetermined length is called a print 3) and to send it out as a print; a negative film send-out section 60 to cut the negative film 2 used in the exposure section 20, to insert the cut negative film 2 into an envelope for the negative film if necessary, and to send it out; and a conveyor mechanism 70 as a comparing and conveying means to compare one unit of negative film 2 sent in through the negative film send-out section 60 (for the convenience of easier understanding, this one unit may be interpreted as one order which stands for one processing unit ordered by a customer, namely, one roll of negative film to be developed and printed) with one unit of finished print sent in through the print send-out section 50 and to convey this pair of units to the portion where the finished unit is picked up by an operator.

Figure 3:
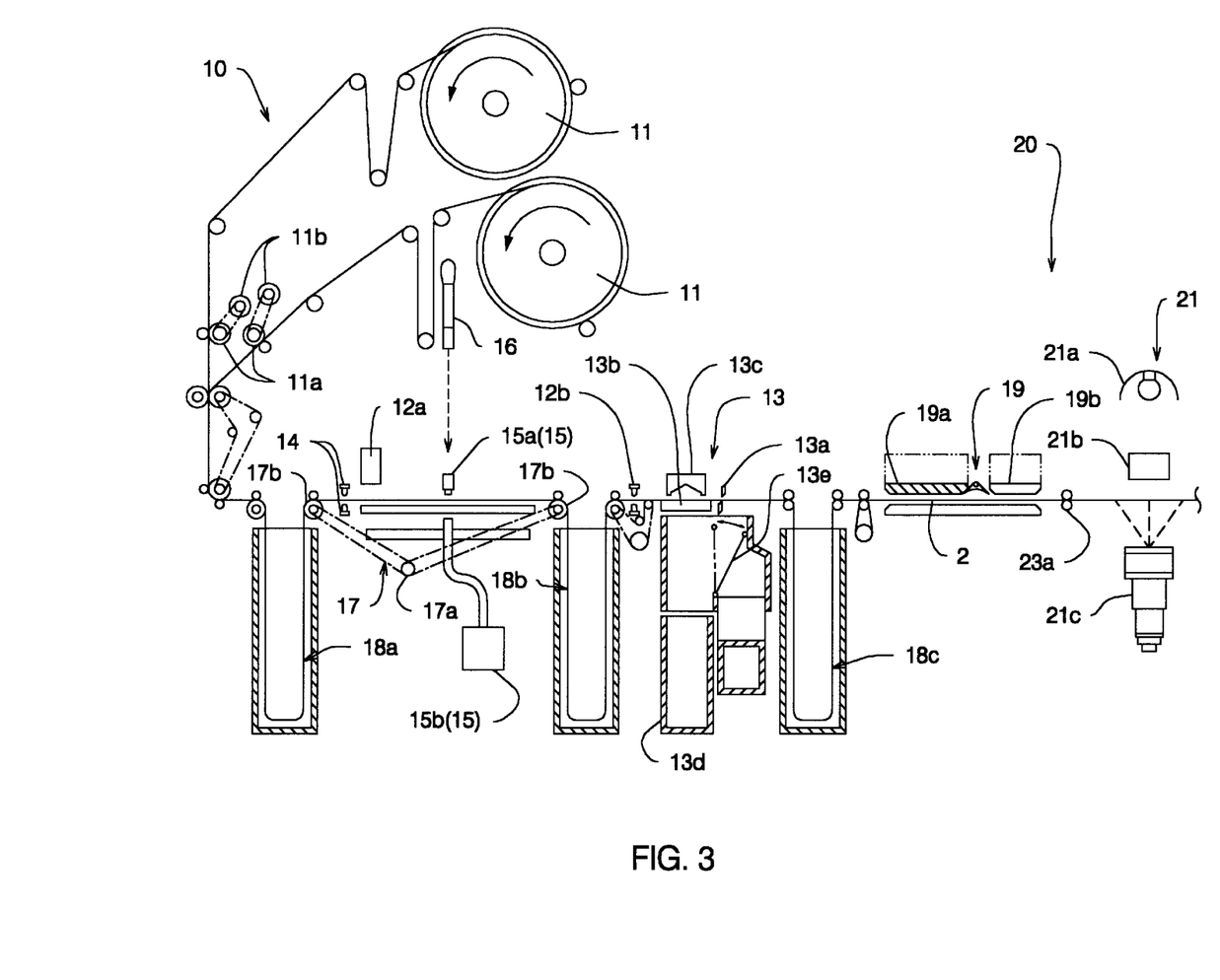
FIG. 3 is a detailed schematic view of the structure of the negative film supply section of FIG. 1.

As shown in detail in FIG. 3, the negative film supply section 10 can be loaded with two rolls of negative film reels 11 each of which winds up 100 rolls of negative film 2 connected together by splice tape 2A (an example of the connecting member). The negative film is pulled out of the negative film reels 11, and selected in turn, by a loading roller 11a driven by a loading motor 11b.

The word "a negative film 2" is used in this specification and has a plurality of meanings. It can mean a negative film 2 of one order unit having been developed according to the customer's order; a long piece of negative film 2 elongated by connecting these developed negative films 3 one after another with the splice tape 2A; a short piece of negative film 2 cut out of the long piece of negative film 2 into one order unit; and a piece of negative film 2 cut out of the short piece of negative film 2.

On each order unit of the negative film 2 is attached a bar code sheet and the bar code includes such individual information as the film number of the negative film 2 of each order. Furthermore, along a negative film conveying line formed by a film leading guide, which is not illustrated herein, the negative film supply section 10 is provided with a bar code reader 12a to read the bar code, a picture detecting sensor 14 to check the configuration of an image frame of the negative film 2, and a negative film cutter 13 to divide the negative film into each order unit of negative film by cutting the area of the splice tape 2A of the negative film 2.

Figure 4:
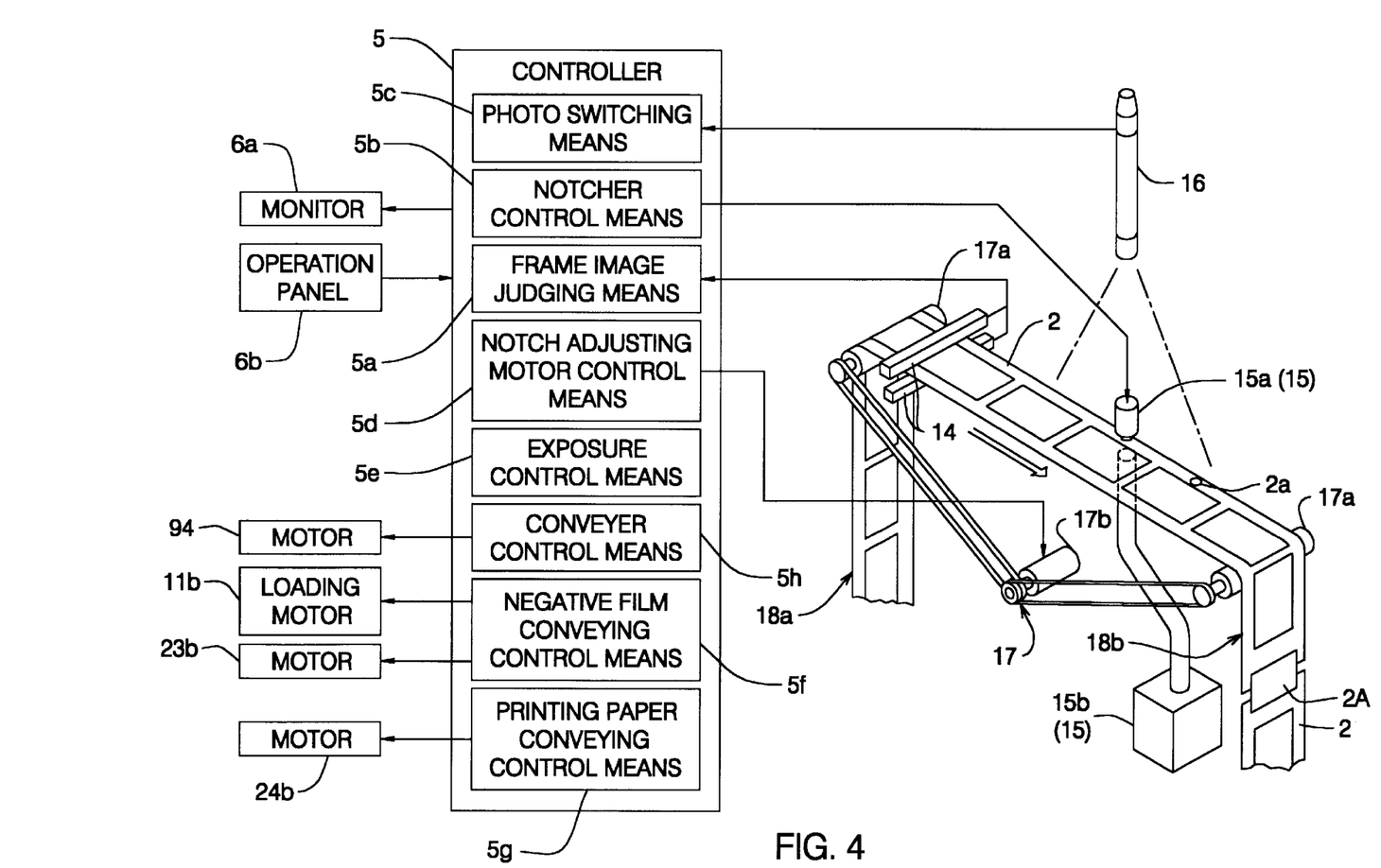
FIG. 4 is a block diagram of a controller according to the present invention.

The picture detecting sensor 14 comprises a light emitter and a light receiver, and the data detected by the detecting sensor 14, as shown in FIG. 4, is transmitted to an image frame judging means 5a of a controller 5 and the position of an image frame is confirmed by detecting the configuration of the image frame based on the amount of light received after having passed through the negative film 2.

To handle the case where the configuration of the image frame cannot be detected, that is, the case of a failure in positioning the negative film 2 according to the position of the image frame, a notcher mechanism 15 is installed as a mark forming means between the picture detecting sensor 14 and the negative film cutter 13 so that a sign indicating the location of the image frame shall be marked by an operator.

The notcher mechanism 15 comprises a notcher 15a which descends from above onto the negative film 2 to form a notch 2a as a positioning mark on the negative film 2 and a chip suction pump 15b whose nozzle is located below the lower surface of the negative film 2 to suck the notch chips produced by the notcher 15a. The notch punching by the notcher 15a is executed by an operator with a manual input command from an operation panel 6b connected to the controller 5 through a notcher control means 5b.

While this notch punching goes on, the chip suction pump 15b is operated to immediately suck the notch chips punched out by the notcher 15a. During the notch punching, an operator can transfer the negative film 2 independently from the other negative film conveyor mechanisms with a manual input command from the operation panel 6b using a negative film conveying means 17 composed of a notch adjusting motor 17b and notch adjusting rollers 17a, and a notch adjusting motor control means 5d. An expected position of the negative film 2 can be adjusted relative to the notcher 15a by moving the negative film 2 back and forth.

Above the notcher mechanism 15 is placed a TV camera 16 to take photos of the positioning operation for adjusting the position of the negative film 2 relative to the notcher 15a so that the operator can control the operation panel 6b while watching the movement of the negative film 2. The TV camera 16 is adjusted so as to catch the image frame of the negative film 2 and the notch point to be formed by the notcher 15a. The input lines of a monitor 6a are switched by a photo switching means 5c so that the photos taken by the TV camera 16 shall be displayed on the monitor 6a.

To restrict the positioning movement of the negative film 2 with respect to the notcher 15a within the range of the notcher 15a and not to cause any effect to any other processing areas, a first loop forming portion 18a and a second loop forming portion 18b are disposed on both sides of the notcher mechanism 15 in the negative film conveying direction respectively.

Figure 5:
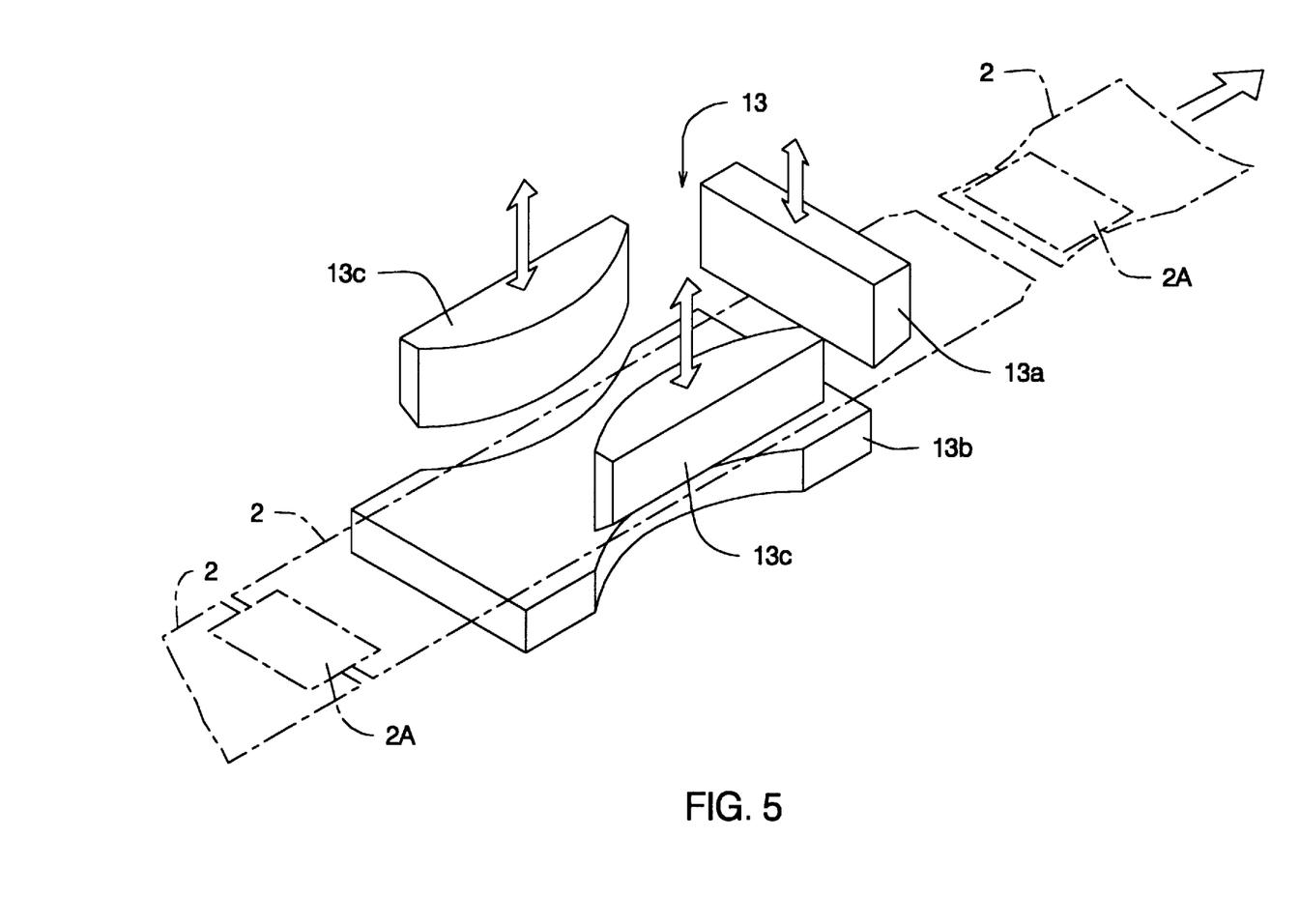
FIG. 5 is a schematic view of a negative film cutter disposed in the negative film supply section of the photographic processor.

A negative film cutter 13, as schematically shown in FIG. 5, comprises an upper blade 13a which is movable up and down and disposed transverse to the negative film conveying line, a pair of upper blades 13c which are movable up and down and disposed on both sides of the negative film conveying line, and a lower blade 13b which is fixed on the film conveying passage. The negative film 2 is transversely cut when the upper blade 13a is moved down to the lower blade 13b and then both sides of the negative film 2 are trimmed off in an arc when the upper blades 13c are moved down to the lower blade 13b. The trimming in an arc shape has an effect of cutting off the offset portion of the negative film 2 where adjacent films have been spliced with offset by the splice tape 2A.

The spliced portion of the negative film 2 is detected with a splice sensor 12b. Below the negative film cutter 13 are placed two trash boxes 13d to collect the chips. The chips are separated into two kinds of groups by a chip separating guide 13e and then they fall into the respective boxes. Another loop forming portion 18c is also provided downstream of the negative film cutter 13 in order to prevent one order of negative film 2 from extending over both the cutting process by the negative film cutter 13 and the subsequent exposure process. Reference numeral 19 is a midway inserting portion to insert a piece of negative film and the like into the negative film conveying line. When a guide 19a (shown shaded in FIG. 3) is removed, a negative film 2 can be inserted and a guide 19b comes to serve as an upper guide for the midway insertion. Downstream of the midway inserting portion in the negative film conveying direction is disposed the exposure section 20.

Figure 6:
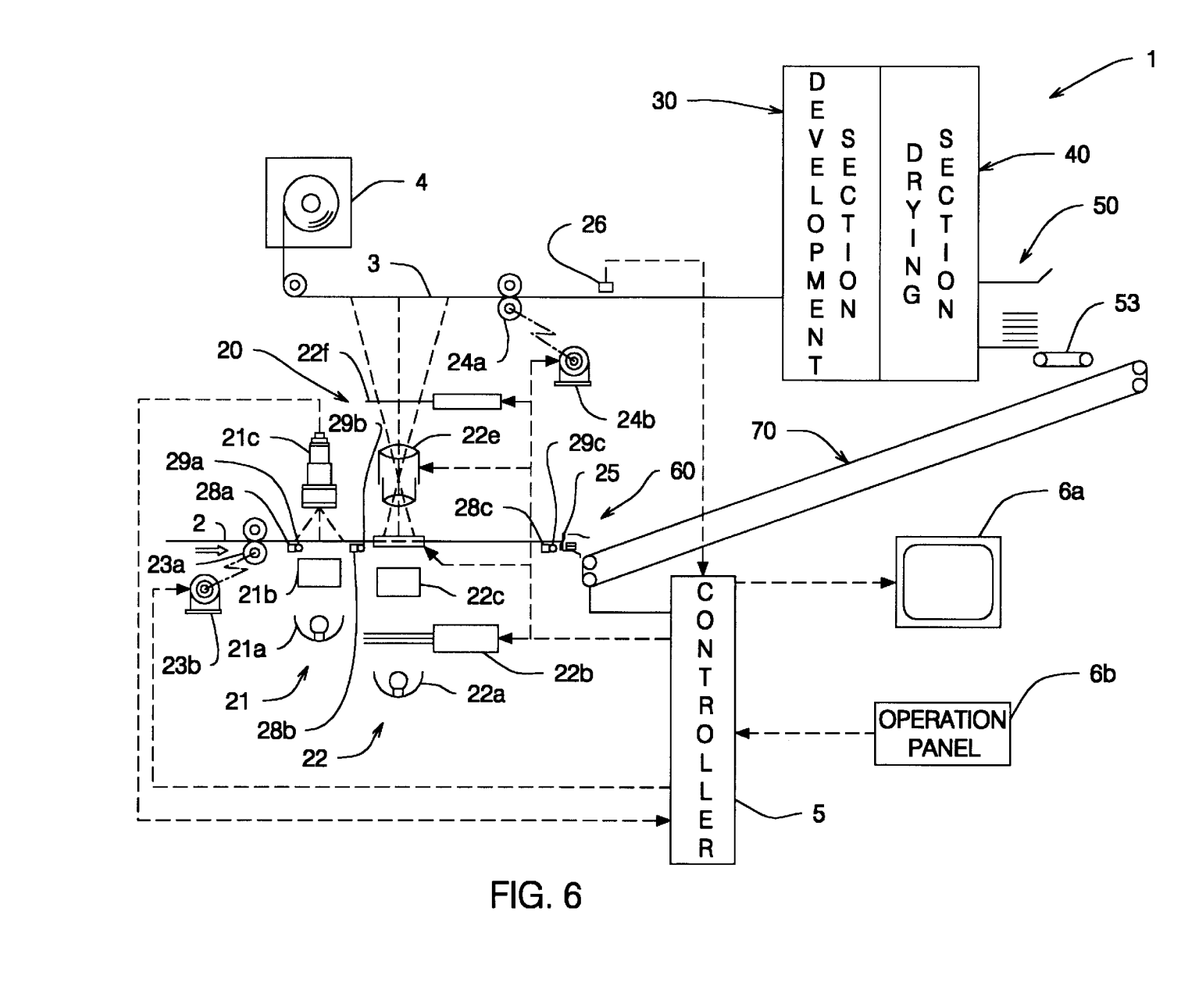
FIG. 6 is a schematic view of the structure of the exposure section of FIG. 1.

As shown in FIG. 6, the exposure section 20 comprises: a film reading device 21 comprising a reading light source 21a, a light diffusing barrel 21b and an image sensing device 21c disposed upstream of the film conveying direction; an exposure device 22 comprising an exposure light source 22a, a color modulating filter 22b, a light diffusing barrel 22c, a negative film mask 22d, a printing lens 22e, and a shutter 22f installed downstream of the film conveying direction; and a pair of rollers 23a and a motor 23b to drive the rollers 23a in order to convey the negative film 2 from the negative film supply section 10 to the negative film send-out section 60 via the exposure section 20. In addition, within the area of the film reading device 21 (a film reading portion) is installed a picture detecting sensor 28a to position the desired image frame on the film reading device 21 and a notch sensor 29a to read the notch 2a formed by the notcher 15a to cope with the case that the image frame is improper for positioning. Within the area of the exposure device 22 (an exposure portion) are installed a picture detecting sensor 28b to position the desired image frame on the exposure device 22 and a notch sensor 29b to read the notch 2a formed by the notcher 15a to handle the case where the image frame is improper for positioning.

The negative film 2 conveyed by the rollers 23a is at first positioned by either of the picture detecting sensor 28a or the notch sensor 29a and each image frame of the negative film 2 is read out by the film reading device 21. Then the information of the image frame is transmitted to the controller 5. Based on the image information transmitted from the film reading device 21, an exposure control means 5e of the controller 5 determines an exposure condition to print the image of the negative film 2 onto the printing paper 3.

When the image frame of the negative film 2 is positioned on the negative film mask 22d by either the picture detecting sensor 28b or the notch sensor 29b, the printing paper 3 is exposed to light under the previously-determined exposure condition by controlling the color modulating filter 22b and the shutter 22f. Furthermore, the controller 5 can display a simulated image which would be printed on the printing paper 3 under the previously-determined exposure condition obtained by processing the image information of the negative film 2 read by the film reading device 21. Then the operator can observe the simulated image on the monitor 6a and correct the exposure condition through the operation panel 6b if necessary.

The negative film 2, having been exposed in the exposure section 20, is cut into every 6 frames or every 4 frames by a negative film cutter 25 installed in the negative film send-out section disposed downstream of the exposure device 22 in the film conveying direction. Consequently, one order of the negative film 2 turns into a plurality of pieces of negative film 2. Within the area of this negative film cutter 25 (a cutting portion are also installed a picture detecting sensor 28c and a notch sensor 29c. The picture detecting sensor 28c positions the desired image frame of the negative film 2 on the negative film cutter 25 properly. The notch sensor 29c reads the notch 2a formed by the notcher 15a to cope with the case where the image frame is improper for the positioning. The piece of negative film 2 is sent out to the conveyor mechanism 70 by the one order unit, and some pieces of the negative film 2, in response to the required specifications, are inserted into negative film envelopes by a negative film inserting device (not illustrated). These negative film envelopes, after being folded, are sent out to the conveyor mechanism 70. The positioning and the conveying of the negative film 2 in the exposure section 20 are controlled by a negative film conveying control means 5f of the controller 5.

A plurality of developing tanks (not illustrated) are installed in the development section 30. The printing paper 3 with the image of the negative film 2 printed in the exposure section 20 is developed while being passed through, after a correction typing portion 26, these developing tanks in turn by a roller 24a driven by a motor 24b. Upstream of the development section 30 is installed a cutter 27 to cut the printing paper 3 to handle an emergency case where the printing paper 3 cannot be continuously sent between the exposure section 20 and the development section 30 even though the printing paper 3 has a loop 3A before entering the development section 30.

The developed printing paper 3 is dried in the drying section 40, sent to the print send-out section 50, cut by the paper cutter 51 into a finished print 3, and sent out to the conveyor mechanism 70 by a transverse sending conveyor 53. Reference numeral 54 designates a printing paper bypass to send out a non-cut printing paper 3 in the case where the printing paper 3 cannot be sent out to the conveyor mechanism 70 due to some trouble. The conveying of the printing paper 3 or the finished print 3 and branching thereof to the printing paper bypass 54 are controlled by a printing paper conveying control means 5g of the controller 5.

Figure 7:
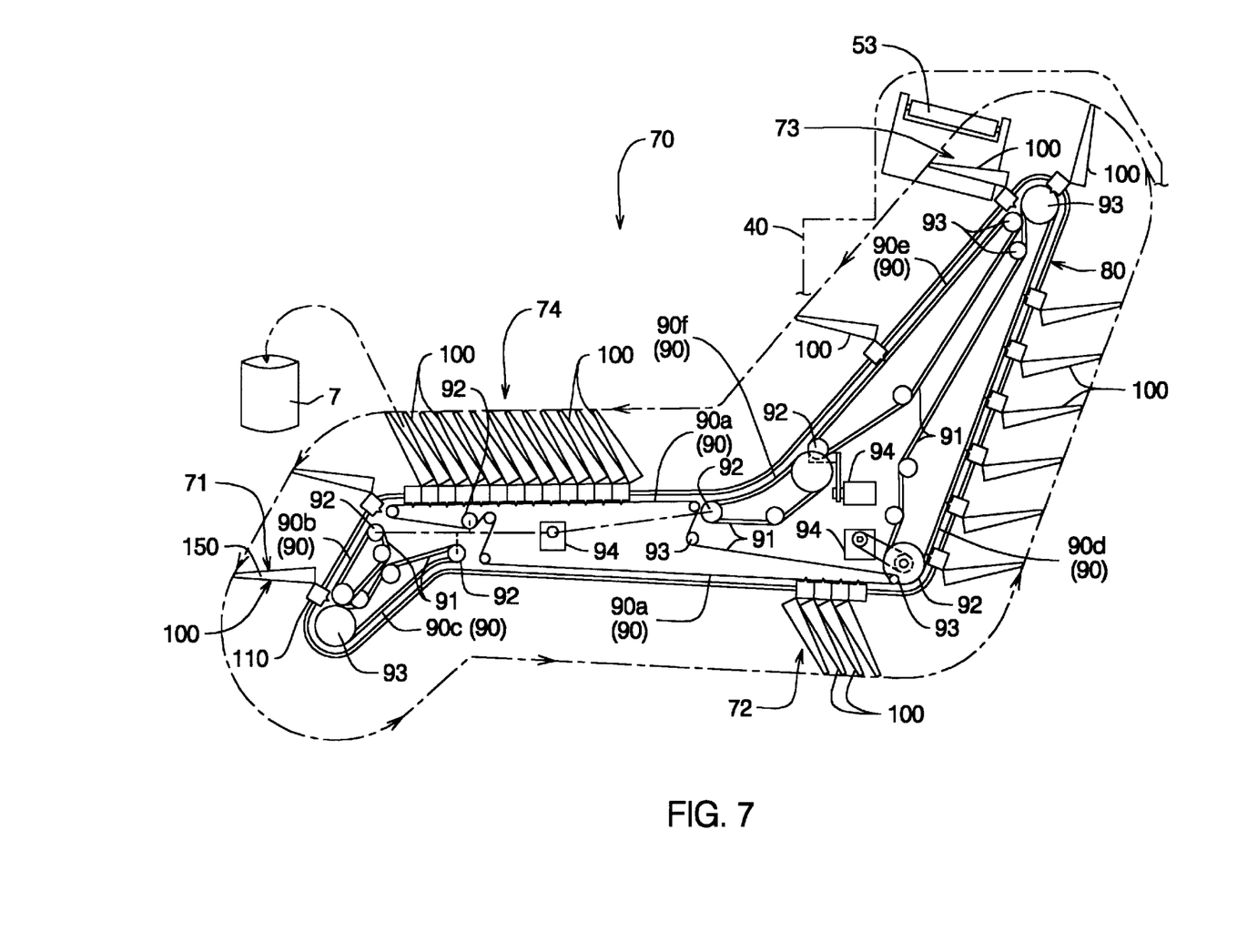
FIG. 7 is a schematic view of a conveyor mechanism according to the present invention.

The conveyor mechanism 70, as shown in FIG. 7, is a tray-conveyor system, which is equipped with a plurality of running trays 100 guided along a closed guide path 80 and driven by a driving means 90. On the conveyor line defined by the closed guide path 80 are disposed a negative film send-in station 71 to send in the negative film 2 through the negative film send-out section 60 located at the lower part of the photographic processor 1, a stand-by station 72, a print send-in station 73 to send in the finished print 3 through the print send-out section 50 located at the higher part of the photographic processor 1, and a check-up station 74 to match up one unit of negative film 2 with the corresponding finished print 3.

The closed guide path 80 is made up of a pair of rails having almost circular sections and link members connecting the rails at predetermined intervals. The tray 100 comprises a runner 110 mounted on the rails and traveling along the rails and a carrier 150 connected to the upper part of the runner 110.

The driving means 90 to convey the trays 100 employs a chain drive system which adopts a chain 91 as an endless driver, and, as shown in FIG. 7, is divided into different driving devices from a first driving device 90a to a sixth driving device 90f. The first driving device 90a is disposed to cover the check-up station 74 and the stand-by station 72. The second driving device 90b is disposed to transfer the empty trays 100 to a tray stop position in the negative film send-in station 71. The third driving device 90c is disposed to transfer the trays 100 loaded further with the negative film 2 to a storage line in the stand-by station 72 formed by a part of the first driving device 90a. The fourth driving device 90d is disposed to transfer in turn the trays 100 waiting in the stand-by station 72 to the tray stop position in the print send-in station 73 and to raise the trays 100 along a steep slope. The fifth driving device 90e is disposed to lower the trays 100 loaded with the finished prints 3 along a steep slope and to send them into the area formed as the check-up station 74 of the first driving device 90a. Between the fifth driving device 90e and the first driving device 90a is disposed the sixth driving device 90f to transfer the trays 100 along the curved line as the closed guide path 80 curves before the check-up station 74.

Each driving device described above comprises a chain 91, a drive sprocket 92 and direction change sprockets 93 mating with the chain 91, and a drive motor 94 to drive the drive sprocket 92. Of these driving devices, the first, second, third, and sixth driving devices 90a, 90b, 90c, 90f are driven by a common drive motor 94, but the fourth and fifth driving devices 90d, 90e are independently driven by respective drive motors 94 as they must be intermittently driven according to their respective timing.

Each chain 91 is equipped at every predetermined pitch with traction link plates which have traction portions extending parallel to the direction of the chain roller axis, and through these traction portions each chain transfers the trays 100. Each drive motor 94 is controlled so as to work cooperatively with other drive motors by a conveyer control means 5h of the controller 5.

Referring to the operation of the photographic processor 1, a negative film reel 11 is wound with a developed long piece of negative film 2 mounted thereon. The front end of the long piece of negative film 2 or the leading end attached to the front end is pulled out and introduced into the negative film conveying line by a rolling roller 11a. The negative film 2 introduced into the negative film conveying line is guided by a horizontally-extending guide member (not illustrated) and passes through the first loop forming portion 18a, and an image frame is detected by the picture detecting sensor 14. When the detected image frame is judged to be improper for positioning by the image frame judging means 5a, a notch 2a representing the position of this image frame is formed by the notcher mechanism 15. In this case, when the image frame adjacent to the image frame judged to be improper for positioning is proper for positioning, the improper image frame may be positioned according to this adjacent and proper image frame. However, when the proper image frame is some distance away from the improper image frame, this distance can cause an error and it needs the notch 2a for positioning.

To form the notch 2a, an operator watches the monitor 6a and operates the notch adjusting motor 17b using a key on the operation panel 6b so that a predetermined position defined with respect to the image frame comes exactly under the notcher 15a. During this operation, the difference in the movement of the negative film 2 between that in the area of notcher mechanism 15 and that in the other areas is canceled by forming a loop in the first and the second loop forming portions 18a, 18b with dislocated guide members (not illustrated).

The negative film 2 having the notches 2a formed if necessary, is cut at its connecting areas detected by the splice sensor 12b with the negative film cutter 13. These are sent to the exposure section 20 in a form of one order of short piece of negative film 2. In the exposure section 20, the configuration of the image frame is detected by the picture detecting sensor 28a of the film reading device 21. Then according to this detected result, the negative film conveying control means 5f sets the image frame to be read to the image sensing device 21c by controlling the motor 23b. For the image frame having a configuration not detected by the picture detecting sensor 28a, a positioning notch 2a has been previously formed by the notcher mechanism 15, so that the image frame to be read can be set to the image sensing device 21c by detecting the notch 2a with the notch sensor 29a.

Also in the exposure device 22, the image frame which is to be exposed but whose configuration has not been detected by the picture detecting sensor 28b is set to the exposure position according to the notch detected by the notch sensor 29b. Similarly in the cutting process where the negative film piece 2 is cut by the negative film cutter 25, the image frame whose configuration has not been detected by the picture detecting sensor 28c can be set precisely so that the portion between the image frames come to the cutting position according to the notch detected by the notch sensor 29c.

The negative film 2 cut into one order unit of negative film 2 by the negative film cutter 25 is loaded into the tray 100 in the negative film send-in section 71. There it is combined with the print 3 of the same order in the print send-in station 73. Then it is sent into the check-up station 74. In the check-up station 74, an operator puts the print 3 and the piece of negative film 2 into a DP-bag 7 after confirming that they match for each tray. As this check-up station 74 is also provided with a monitor 6a and a control panel 6b, an operator in the check-up station 74 can give a positioning notch 2a to the image frame judged to be improper for positioning in the negative film supply section 10 by operating the notcher mechanism 15 through the control panel 6b while watching the monitor 6a.

The shape of the positioning notch 2a described above, may either be a circle, a semicircle, a triangle, etc. The notch may also be a notch or an aperture provided that the notch position can be detected exactly by the notch sensors 29a, 29b, 29c. The notch can be set anywhere other than the center of the image frame of the negative film provided that its position is relatively specified beforehand.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A photographic processor comprising:
   a negative film supply section for supplying and conveying a negative film, and
   an exposure section for printing an image frame of the negative film supplied and conveyed from said negative film supply section,
   wherein said negative film supply section includes a picture detecting sensor for judging a condition of an image frame of the negative film and a mark forming means for giving a visual positioning mark to the image frame when the image frame is detected by said picture detecting sensor to be improper for positioning.

2. A photographic processor as claimed in claim 1, further comprising two loop forming portions for looping the negative film both upstream and downstream of said mark forming means with respect to a conveying direction of the negative film.

3. A photographic processor as claimed in claim 2, further comprising an separate negative film conveying means for conveying the negative film, said separate negative film conveying means being installed between said two loop-forming portions.

4. A photographic processor as claimed in claim 1, further comprising:
   a TV camera for taking photos of an operation to provide the positioning mark by said mark forming means, and
   a monitor for confirming the photos from said TV camera.

5. A photographic processor as claimed in claim 2, further comprising:
   a TV camera for taking photos of an operation to provide the positioning mark by said mark forming means, and
   a monitor for confirming the photos from said TV camera.

6. A photographic processor as claimed in claim 3, further comprising:
   a TV camera for taking photos of an operation to provide the positioning mark by said mark forming means, and
   a monitor for confirming the photos from said TV camera.

7. A photographic processor as claimed in claim 1, wherein said mark-forming means includes a notcher for punching a notch on a side of the negative film.

8. A photographic processor as claimed in claim 2, wherein said mark-forming means includes a notcher for punching a notch on a side of the negative film.

9. A photographic processor as claimed in claim 3, wherein said mark-forming means includes a notcher for punching a notch on a side of the negative film.

10. A photographic processor as claimed in claim 4, wherein said mark-forming means includes a notcher for punching a notch on a side of the negative film.

11. A photographic processor as claimed in claim 7, wherein said mark-forming means includes a suction nozzle for sucking notched chips produced by said notcher.

12. A photographic processor as claimed in claim 8, wherein said mark-forming means includes a suction nozzle for sucking notched chips produced by said notcher.

13. A photographic processor as claimed in claim 9, wherein said mark-forming means includes a suction nozzle for sucking notched chips produced by said notcher.

14. A photographic processor as claimed in claim 10, wherein said mark-forming means includes a suction nozzle for sucking notched chips produced by said notcher.

15. A photographic processor as claimed in claim 1, wherein the negative film supplied and conveyed from said negative film supply section to said exposure section is a short piece of negative film divided out of a long piece of negative film by cutting it in a connecting member, said long piece of negative film having been formed by connecting a plurality of negative films with the connecting member.

16. A photographic processor as claimed in claim 1, further comprising at least one portion where the negative film is positioned in the processor and said at least one portion including both the picture detecting sensor and a positioning mark sensor disposed therein.

17. A photographic processor as claimed in claim 16, wherein said at least one portion includes a film reading portion, an exposure portion, and a cutting portion where the negative film is cut into shorter pieces.

* * * * *